United States Patent

[11] 3,631,938

| [72] | Inventor | Wilfred J. Eggington<br>Claremont, Calif. |
|---|---|---|
| [21] | Appl. No. | 725,670 |
| [22] | Filed | May 1, 1968 |
| [45] | Patented | Jan. 4, 1972 |
| [73] | Assignee | Aerojet-General Corporation<br>El Monte, Calif. |

[54] FLUID CUSHION CELLS FOR FLUID CUSHION VEHICLES
4 Claims, 10 Drawing Figs.

[52] U.S. Cl. .................................................. 180/121,
180/118, 180/124
[51] Int. Cl. .................................................... B60v 1/04
[50] Field of Search............................................ 180/121,
124, 127, 118, 128

[56] References Cited
UNITED STATES PATENTS

| 3,185,240 | 5/1965 | Eggington et al. | 180/121 |
| 3,267,882 | 8/1966 | Rapson et al. | 180/124 X |
| 3,318,406 | 5/1967 | Scheel | 180/124 X |
| 3,321,038 | 5/1967 | Mackie et al. | 180/124 |
| 3,346,063 | 10/1967 | Bertin | 180/121 |
| 3,371,738 | 3/1968 | Bertin | 180/121 |
| 3,401,767 | 9/1968 | Barr | 180/121 |
| 3,414,075 | 12/1968 | Bertin | 180/121 |
| 3,414,076 | 12/1968 | Bertin | 180/124 |
| 3,249,166 | 5/1966 | Cockerell et al. | 180/128 |

*Primary Examiner*—A. Harry Levy
*Attorneys*—Edward O. Ansell and D. Gordon Angus ABSTRACT: This disclosure relates to cushion cells for fluid cushion vehicles.

A cushion cell according to the present disclosure comprises an expandable chamber capable of expanding and contracting. Orifice means is provided through the bottom of the expandable chamber to form a fluid cushion below the expandable chamber to lift the vehicle. An inlet opening is provided into the expandable chamber to supply that chamber with fluid under pressure.

According to an optional and desirable feature of the present disclosure, a skirt may depend from the expandable chamber to enclose the fluid cushion cell beneath the chamber. According to another optional and desirable feature of the present disclosure, a plurality of cushion cells may be disposed about the periphery of an air cushion vehicle to form an additional cushion cell within the bounds of the peripheral cushion cells.

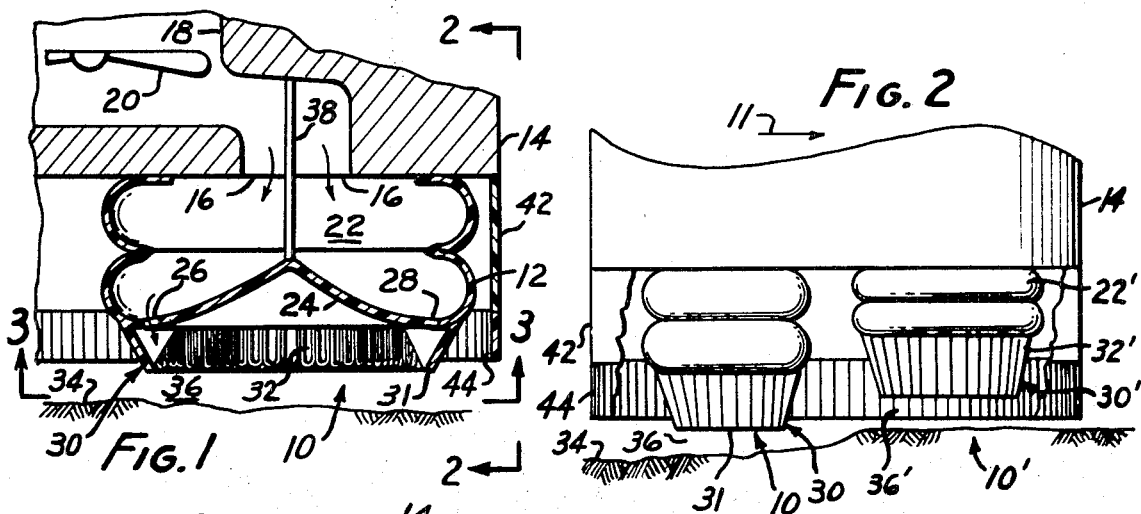

FLUID CUSHION CELLS FOR FLUID CUSHION VEHICLES

This invention relates to cushion cells for fluid cushion vehicles.

Fluid cushion vehicles, sometimes known as "ground effect vehicles" include cells which provide a cushion of pressurized fluid, such as air, between the terrain and the vehicle, to lift the vehicle. Such vehicles are capable of hovering above the terrain and are ordinarily provided with suitable drive mechanisms, such as jets or propellers, to propel the vehicle forward.

Heretofore, air cushion vehicles have closely followed the surface of the terrain so that minor fluctuations in the elevation of the terrain surface cause similar minor fluctuations in the elevation of the vehicle. Prior air cushion vehicles experiencing a decrease in the surface elevation of the terrain have experienced a decrease in the pressure in the fluid cushion upon which the vehicle rides and a corresponding decrease in lifting force against the vehicle. Likewise, if such prior air cushion vehicles experienced an increase in the surface elevation of the terrain, the fluid cushion increased in pressure thereby causing a greater lifting force upon the vehicle. The vehicle, experiencing fluctuations in lifting force also experienced corresponding fluctuations in the elevation of the vehicle.

It is desirable that when a vehicle experiences a depression in the surface elevation of the adjacent terrain, the fluid cushion should likewise decrease in elevation. Furthermore, if a vehicle experiences an increase in elevation of the surface of the adjacent terrain, the fluid cushion should likewise increase in elevation. In this manner, the elevation of the frame of the vehicle may be stabilized to prevent minor fluctuations while travelling over a rough or irregular terrain. Furthermore, if the fluid cushion cell follows the elevation of the terrain, there will be less likelihood that the cushion cell will contact the terrain, and drag caused by contact of cushion cells against the terrain may be reduced.

It is an object of the present invention to provide a cushion cell for fluid cushion vehicles which will adjust in elevation in accordance with variations in the elevation of the adjacent terrain.

Another object of the present invention is to provide a cushion cell for use in air cushion vehicles, which cell is capable of adjusting in elevation in accordance with the elevation of the surface of the terrain over which the vehicle is travelling.

Another object of the present invention is to provide a valving mechanism for an air cushion vehicle which will automatically increase and decrease the volume of fluid supplied to the air cushion cell so that appropriate fluid rates are maintained while the vehicle experiences depressions and rises in the surface elevation of the terrain.

Another object of the present invention is to provide a plurality of cushion cells arranged about the periphery of an air cushion vehicle to thereby form an additional cushion cell bounded by the peripheral cushion cells.

A cushion cell according to the present invention comprises an expandable chamber capable of expanding and contracting in volume. The chamber is supplied with fluid under pressure and orifice means is provided to form a cushion cell below the chamber.

The expandable chamber supplies the cushion cell with pressurized fluid to thereby lift the vehicle. The size of the expandable chamber is regulated by the pressure of fluid below the vehicle. When the pressure below the vehicle drops, as may be occasioned by a decrease in the elevation of the adjacent terrain, the pressure differential between the cushion and the expandable chamber changes, and the volumetric size of the expandable chamber increases to lower the chamber relative to the vehicle. At the same time, due to the decreased pressure in the cushion cell, the pressure differential between the cushion cell and the expandable chamber increases and more fluid is passed through the orifice to the cushion cell. Likewise, if the pressure in the cushion cell increases, as may be occasioned by an increase in the elevation of the adjacent terrain, the volumetric size of the expandable chamber decreases, and thereby raises the chamber relative to the vehicle, and the volume of fluid passing through the orifice decreases.

According to an optional and desirable feature of the present invention, bias means is provided for normally contracting the expandable chamber and the pressurized fluid within the expandable chamber acts against the bias means to expand the chamber.

According to another optional and desirable feature of the present invention, skirts depend from the expandable chamber to enclose a cushion cell beneath the chamber.

According to another optional and desirable feature of the present invention, cushion cells are arranged about the periphery of the fluid cushion vehicle to form an additional cushion cell within the bounds of the peripherally disposed cushion cells.

According to another optional and desirable feature of the present invention, peripheral cushion cells interlock to form a fluid seal between adjacent peripheral cushion cells when the peripheral cushion cells are inflated with pressurized fluid.

The above and other features of this invention will be more fully understood from the following detailed description and the accompanying drawings, in which:

FIG. 1 is a side view elevation in cutaway cross section of a cushion cell in accordance with one embodiment of the present invention;

FIG. 2 is a side view elevation partly in cutaway cross section of the cushion cell illustrated in FIG. 1 taken at 2—2 in FIG. 1;

FIG. 3 is a bottom view of the cushion cell illustrated in FIG. 1 taken at line 3—3 in FIG. 1;

FIG. 4 is a side view elevation of a cushion cell in accordance with the presently preferred embodiment of the present invention;

FIG. 5 is a bottom view of the cushion cell illustrated in FIG. 4 taken at line 5—5 in FIG. 4;

FIG. 6 is a bottom view of an air cushion vehicle having a plurality of cushion cells in accordance with the present invention;

Figure 10:
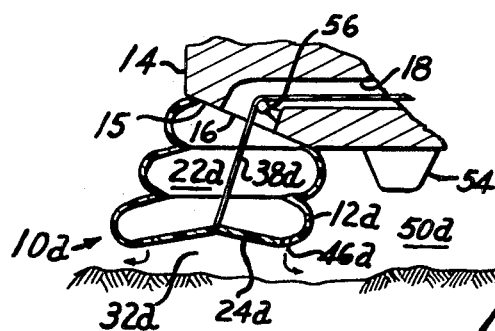
FIG. 10 is a side view elevation in cutaway cross section of another modification of a cushion cell in accordance with the present invention.

In FIGS. 1–3 there is illustrated a cushion cell 10 according to the present invention. Cell 10 comprises a flexible membrane 12 fixedly mounted to body 14 of an air cushion vehicle. By way of example, body 14 may comprise a rigid frame of the vehicle. Orifice 16 provides fluid communication between duct 18 and chamber 22 formed by flexible membrane 12. A suitable pressure-producing device such as compressor 20, may be located in duct 18 to provide flow of pressurized fluid to expandable chamber 22 formed by membrane 12. It is to be understood that other mechanisms such as pumps and the like may be utilized for pressuring the fluid. Duct 18 is connected to a suitable source of fluid (not shown) such as atmospheric air.

The bottom of chamber 22 is closed by membrane 24 having orifices 26 and 28 therethrough. Skirt 30 depends from membrane 12 below membrane 24 and encompasses orifices 26 and 28. Skirt 30 is constructed of a plurality of substantially U-shaped membranes 31 which are open at the bottom and to the inside to form chamber 32 between the membranes 31. Membranes 31 may be integral with membranes 12 and 24 and may be constructed of the same material as membranes 12 and 24. By way of example, the membranes and skirt may be constructed from sealed fabric such as neoprene-coated "Dacron" or neoprene-coated nylon, and may have a thickness between approximately 0.005 and 0.015 inch, although the thickness may be greater or less depending upon the particular application.

Chamber 32 is defined between the peripheral walls of skirt 30 and between membrane 24 and the surface of the terrain, as indicated at 34. Skirt 30 forms an opening 36 between the lower part of the skirt and surface 34 of the terrain to permit discharge of fluid from chamber 32. Bias means 38, such as an elastic band or spring, is mounted to the center of membrane 24 and supports the center of membrane 24 by attachment to frame 14.

Flexible skirt 42 preferably depends from the periphery of support 14 and preferably terminates slightly above the lowermost level of membrane 12. A plurality of deflectible skirts 44 depends from skirt 42. By way of example, skirts 44 may be independently mounted U-shaped membranes mounted to skirt 42.

In operation of the fluid cell illustrated in FIGS. 1–3, and assuming that the surface level of the terrain is not changing, fluid under pressure is admitted into chamber 22 through orifice 16. The fluid in chamber 22 displaces membranes 12 and 24 to inflate the chamber to a volume dependent upon the size of membrane 12, and the bias force provided by bias means 38. The pressurized fluid in chamber 22 passes through orifices 26 and 28 to chamber 32 to inflate skirt 30 to form an air cushion cell below membrane 24. The pressurized fluid in chamber 32 reacts against the surface 34 of the terrain adjacent the cushion cell to thereby lift against membrane 24. The pressure against the bottom of membrane 24 operates on the fluid within chamber 22 to react against the bottom of support 14, thereby lifting the vehicle. The degree of inflation of chamber 22 is dependent upon the bias force of bias means 38, the force within membrane 12 to resist inflation, and the pressure within chambers 22 and 32.

If the surface below opening 36 decreases in altitude, as for example by a depression in the surface of the terrain, the pressure within chamber 32 decreases due to the loss of pressurized fluid within chamber 32 escaping through the enlarged opening 36. The decreased pressure within chamber 32 alters the pressure differential between chambers 22 and 32 so that chamber 22 expands downwardly. Chamber 22 expands until the pressurized fluid within chamber 22 on membrane 24 is balanced by the elastic force provided by bias means 38, the pressure within chamber 32, and the tension in membrane 12.

Chamber 22 operates as a pressure-sensitive valve to regulate the flow of fluid through orifices 26 and 28 to the air cushion chamber 32. If the pressure in chamber 32 decreases, for example by a decrease in the elevation of the terrain below opening 36 of chamber 32, chamber 22 depends downwardly thereby moving chamber 32 downwardly. During the expansion of chamber 22, more fluid is passed through orifices 26 and 28 to chamber 32 due to decreased pressure in chamber 32.

If the terrain of surface 34 should rise in elevation, thereby decreasing the size of opening 36, the pressure within chamber 32 increases due to the decreased size of opening 36 for the escaping pressurized fluid. The increased pressure within chamber 32 reacts upon membrane 24 to raise membrane 24 to decrease the size of chamber 22. Chamber 22 decreases in size until a balance is reached between the fluid-pressurizing chamber 22 and the force of pressurized fluid in chamber 32, bias means 38, and the tension on membrane 12. At the same time, less fluid is passed through orifices 26 and 28 due to the increased pressure in chamber 32.

Skirt 30 thereby retracts and extends with chamber 22 to closely follow the terrain of surface 34. In this manner, the cushion cells automatically adjust to fluctuations in elevation of the terrain.

If desired, skirt 42 may be provided depending from the periphery of support 14. Skirt 42 may be inflated by fluids escaping from opening 36 of each cushion cell, or, alternatively, may be separately inflated by means of pressurized fluid passing through an orifice (not shown) connected to duct 18. Skirt 44 comprises a plurality of arculate skirts which may individually depend from skirt 42 in such a manner that they may independently be deflected. In the event that some of the arculate skirts 44 contact a stationary object, skirts 44 are deflected and are thereby not damaged.

The cushion cell illustrated in FIGS. 1–3 is capable of operating over rigid terrain, such as rock or ground, as well as a fluid terrain such as marshes, lakes and oceans. The cell is particularly useful for compensating for fluctuations in the surface of water, as may be occasioned by ripples and waves on the water.

As shown particularly in FIG. 2, the surface of the terrain adjacent cushion cell 10 is lower than the surface of the terrain adjacent cell 10'. Assuming that the vehicle is moving in the direction of arrow 11, chamber 32' of cell 10' experiences an increase in pressure due to the closer relationship of surface 34 to chamber 32' and the corresponding decrease in the size of opening 36'. The increased pressure in chamber 32' operates on the membrane between chamber 32' and the deformable chamber 22' to alter the pressure differential between the two chambers. When this occurs, chamber 22' decreases in size, thereby raising skirt 30' in elevation. Skirts 30 and 30' will thereby closely follow the fluctuations in the elevation of surface 34.

FIGS. 4 and 5 illustrate a modification of the cushion cell illustrated in FIG. 1. In FIGS. 4 and 5, cushion cells 10a are constructed of membranes 12a and 24a which are similar in construction to membranes 12 and 24 of cushion cell 10 illustrated in FIGS. 1–3. Membranes 12a and 24a form a chamber 22a which is constructed in the same manner as chamber 22 in the embodiment illustrated in FIGS. 1–3. Preferably, bias means (not shown) supports the center of membrane 24a in the same manner that the center of membrane 24 is supported in the embodiment illustrated in FIGS. 1–3.

The embodiment illustrated in FIGS. 4 and 5 differs from the embodiment illustrated in FIGS. 1–3 in that cushion cell 10a does not have a skirt. Orifices 46 are provided through the periphery of membrane 24a to provide a fluid stream directed toward the surface of the terrain. The fluid stream provides a fluid barrier bounding region 32a below membrane 24a. The fluid barrier operates in a manner similar to skirts 30 illustrated in FIGS. 1–3, and the fluid pressure in region 32a below each cell is maintained adequate to lift the vehicle by virtue of pressurized fluid deflected by the terrain surface into region 32a.

When cushion cell 10a experiences an increase or decrease in elevation of the adjacent surface of the terrain, the pressure within region 32a 43 surrounded by the fluid streams likewise increases or decreases. The change of pressure in region 32a alters the pressure differential between the deformable chamber contained within the cell and the region below the cell, thereby raising the cushion cell in the case of increased terrain elevation, and lowering the cushion cell in the case of decreased terrain elevation. Thus, the cushion cell 10a illustrated in FIGS. 4 and 5 closely follows the terrain and operates in a manner similar to that of cushion cells 10 illustrated in FIGS. 1–3.

FIG. 6 illustrates a bottom view of an air cushion vehicle having a support 14 and a plurality of cushion cells 10b. Cushion cells 10b are disposed about the periphery of support 14 and the cells are bonded together with a suitable resin. The peripheral cushion cells 10b are arranged to form a cushion chamber 50 within the bounds of the peripheral cushion cells 10b. Chamber 50 is, in effect, a chamber having a skirt defined by the cushion cells 10b. Chamber 50 may be supplied with pressurized fluid by means of suitable orifices (not shown) connected to a suitable source of pressurized fluid (not shown). Alternatively, chamber 50 may be pressurized by escaping fluid from orifices 46 of bounding cushion cells 10b.

As illustrated in FIG. 6, the cushion cells 10b are tapered so as to accommodate the curves and corners of the support 14 and to provide tapered bounding walls for the cushion cell 50. A side view of such tapered cushion cells 10b is illustrated in FIG. 7.

Figure 7:
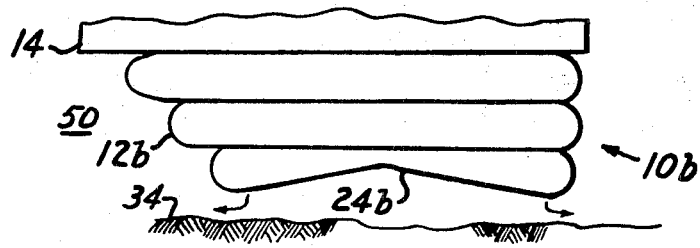
FIG. 7 is a side view elevation of a modified cushion cell for use in the vehicle illustrated in FIG. 6.

FIG. 7 illustrates a tapered cushion cell 10b supported by support means 14 of the air cushion vehicle. Cushion cell 10b comprises membrane 12b mounted to support 14 having bias means (not shown) of a similar construction as that illustrated in FIGS. 1–3. However, in the case of FIG. 7, membrane 12b is of tapered design so as to create a tapered body to the cushion cell. A plurality of orifices (not shown) is disposed about the periphery of membrane 24b in a manner similar to that illustrated in FIGS. 4 and 5. The tapered wall of membrane 12b provides a tapered wall for the chamber 50. Membrane 12b of each of the cushion cells 10b forms a bounding peripheral wall for chamber 50, and air escaping through the orifices through membrane 24b provides a fluid barrier between the region below membrane 12b and the region of chamber 50.

Figure 8:
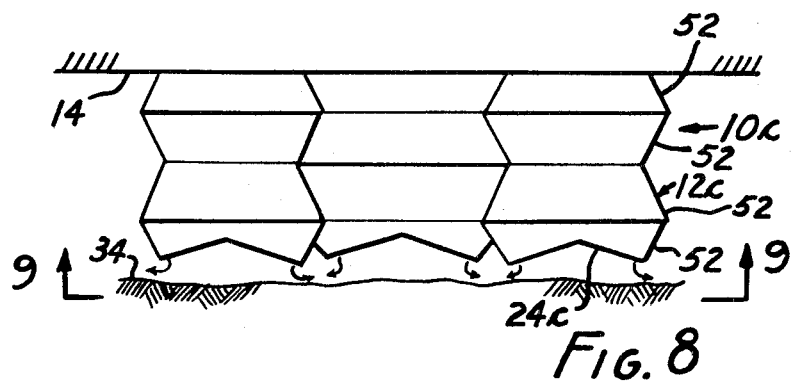
FIG. 8 is a side view elevation of a modification of the cushion cell illustrated in FIGS. 4 and 5 for use in the vehicle illustrated in FIG. 6.
Figure 9:
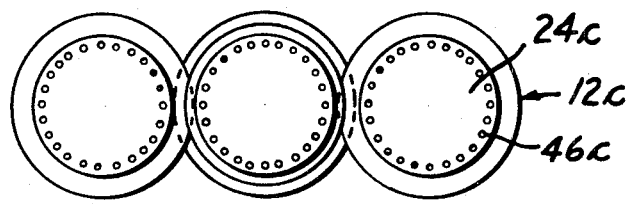
FIG. 9 is a bottom view of the cushion cells illustrated in FIG. 8 taken at line 9—9 in FIG. 8.

FIGS. 8 and 9 illustrate another modification of the cushion cells according to the present invention. In this case, instead of the membranes forming the cushion cell being sealed together, the cells are interlocking so that upon pressurization of the individual cells, their side membranes mate with the membranes of adjacent cells to form a fluid seal to prevent escape of fluid between them. Cushion cells 10c illustrated in FIGS. 8 and 9 depend from support 14 and their membranes interlock to form cushion cell 50 in FIG. 6. In this case, membrane 12c and 24c together form the collapsible and expandible chamber therein. Suitable orifices 46c are provided in membrane 24c to form a fluid stream as hereinbefore described with relation to FIGS. 4 and 5.

Membrane 12c is constructed of a plurality of frustoconical membranes 52 fixed together to form the individual cushion cells. Upon expanding membrane 12c, each membrane 52 assumes the shape illustrated in the drawings and mates with adjacent membranes of adjacent cushion cells to form a fluid seal to prevent escaping of fluid therebetween.

The interlocking cells illustrated in FIGS. 8 and 9 may be used in the peripheral arrangement illustrated in FIG. 6 or below the center of the vehicle frame in the space occupied by chamber 50 in FIG. 6. The latter arrangement offers the advantage of providing a greater lifting area than heretofore achieved with noninterlocking cells.

FIG. 10 illustrates another modification of a cushion cell in accordance with the present invention wherein cushion cell 10d is mounted to wall 15 of support 14. Wall 15 is disposed at an angle to the horizon so that cushion cell 10d is disposed outwardly from the craft. Preferably, the sidewalls of membrane 12d enclose a chamber 50d beneath he craft. Membranes 12d and 24d together enclose chamber 22d to form a collapsible chamber. Bias means 38d is connected to the center portion of membrane 12d and is supported by the craft at a location (not shown). Orifices 46d are provided through membrane 24d to provide a fluid stream directed at the ground to enclose chamber 32d as hereinbefore described with relation to FIGS. 4 and 5.

Many air cushion vehicles include a landing support 54 which depends from the frame 14 of the vehicle for supporting the vehicle while the vehicle is stationary and resting upon the ground. It is preferred that the cushion cells be retractable so that they will not be damaged when the vehicle is resting on the ground. For this reason, bias means 38d extends through duct 18 and is supported by pulley mechanism 56 within the duct. When it is desired to retract the cushion cells 10d to a position so that the craft may land and be supported on supports 54, the tension on bias means 38d is increased by means (not shown) thereby retracting the cushion cells, permitting landing of the vehicle. In this manner, cushion cells 12d may be retracted so that they will not be damaged when the craft is landed. As illustrated in FIG. 10, the cushion cells may depend somewhat outwardly from the vehicle to thereby increase the size of cushion cell 50d to provide greater lifting area for the vehicle.

The present invention thus provides cushion cells which are capable of adjusting in elevation in accordance with fluctuations in the elevation of the adjacent surface terrain. The cells provide mobility over irregular and uneven surfaces such as bodies of water and rough ground. The cells are easily fabricated and effective in use. The present invention also provides a plurality of cushion cells bounded about the periphery of a cushion vehicle to thereby form another cushion within the bounds of the peripherally disposed cushion cells.

This invention is not to be limited by the embodiments shown in the drawings and described in the description, which are given by way of example and not of limitation.

What is claimed is:

1. In a fluid cushion vehicle, means for spacing the vehicle from the terrain, comprising:
   a plurality of first cells forming a periphery depending from the chassis of the vehicle, each cell being constructed of a flexible membrane and comprising
   a chamber capable of expanding and contracting;
   a second cell operative as a cushion between the bottom surface of said chamber and the terrain; and
   orifice means between said chamber and said second cell;
   access means between the source of fluid pressure of the vehicle and said chambers;
   means to provide fluidtight mutual contact between adjacent said first cells whereby is formed an additional central chamber; and
   bias means for contracting said first cells, said bias means depending from the chassis of the vehicle and supporting said flexible membrane.

2. Apparatus according to claim 1 wherein said bias means includes elastic means supporting the bottom of said membrane.

3. In a fluid cushion vehicle, means for spacing the vehicle from the terrain, comprising;
   a plurality of first cells forming a periphery depending from the chassis of the vehicle, each cell comprising
   a chamber capable of expanding and contracting;
   a second cell operative as a cushion between the bottom surface of said chamber and the terrain; and
   orifice means between said chamber and said second cell;
   access means between the source of fluid pressure of the vehicle and said chambers;
   means to provide fluidtight mutual contact between adjacent said first cells whereby is formed an additional central chamber; and
   a skirt depending from each of said first cells.

4. In a fluid cushion vehicle, means for spacing the vehicle from the terrain, comprising;
   a plurality of first cells forming a periphery depending from the chassis of the vehicle, each cell comprising
   a chamber capable of expanding and contracting;
   a second cell operative as a cushion between the bottom surface of said chamber and the terrain; and
   orifice means between said chamber and said second cell;
   access means between the source of fluid pressure of the vehicle and said chambers;
   means to provide fluidtight mutual contact between adjacent said first cells whereby is formed an additional central chamber; and
   a peripheral skirt mounted to the chassis and surrounding said plurality of first cells.

* * * * *